(12) United States Patent
Masuda et al.

(10) Patent No.: US 8,046,769 B2
(45) Date of Patent: Oct. 25, 2011

(54) LOAD STATE MONITORING APPARATUS AND LOAD STATE MONITORING METHOD

(75) Inventors: Mineyoshi Masuda, Kunitachi (JP); Masashi Egi, Kokubunji (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1704 days.

(21) Appl. No.: 11/061,777

(22) Filed: Feb. 22, 2005

(65) Prior Publication Data

US 2006/0150191 A1    Jul. 6, 2006

(30) Foreign Application Priority Data

Dec. 22, 2004    (JP) .................................. 2004-370389

(51) Int. Cl.
*G06F 9/46* (2006.01)
*G06F 15/173* (2006.01)
*G06F 11/30* (2006.01)

(52) U.S. Cl. ........ 718/105; 718/104; 709/223; 709/224; 709/225; 709/226; 702/182; 702/183

(58) Field of Classification Search .................. 718/107, 718/105; 709/220, 227; 702/34, 82, 127, 702/176, 177, 178; 700/179
See application file for complete search history.

(56) References Cited

U.S. PATENT DOCUMENTS

| | | | |
|---|---|---|---|
| 5,124,928 A * | 6/1992 | Aemmer | 700/144 |
| 5,428,556 A * | 6/1995 | Torizawa et al. | 702/34 |
| 5,724,591 A * | 3/1998 | Hara et al. | 713/322 |
| 5,898,870 A * | 4/1999 | Okuda et al. | 718/104 |
| 5,943,232 A * | 8/1999 | Gehi et al. | 700/79 |
| 5,991,707 A * | 11/1999 | Searles et al. | 702/185 |
| 6,026,425 A * | 2/2000 | Suguri et al. | 718/105 |
| 6,134,216 A * | 10/2000 | Gehi et al. | 370/231 |
| 6,199,018 B1 * | 3/2001 | Quist et al. | 702/34 |

(Continued)

FOREIGN PATENT DOCUMENTS

JP    10-240699    9/1998

(Continued)

OTHER PUBLICATIONS

Cheung et al., Load Balancing in Distributed Object Computing Systems, Aug. 2001, Kluwer Academic Publishers, vol. 27, pp. 149-175.*

(Continued)

*Primary Examiner* — Jennifer N To
(74) *Attorney, Agent, or Firm* — Antonelli, Terry, Stout & Kraus, LLP

(57) ABSTRACT

A load monitoring apparatus is provided to monitor a load state of one or more information processing apparatuses in a network and to control the load of such an information processing apparatus based on the monitoring result. Such a load monitoring apparatus comprises a measured value storage unit which stores both measured values and measurement time of performance information (for example, a queue length, a response time and the like) of each information processing apparatus; a fluctuation calculation unit which reads a plurality of measured values measured in a given time from the measured value storage unit for each information processing apparatus, and calculates a fluctuation of the plurality of measured values; and a load state judgment unit which compares the fluctuation calculated with a given threshold to judge the load state of each information processing apparatus. Using a fluctuation, the load state of an information processing apparatus in the network can be detected more accurately.

8 Claims, 12 Drawing Sheets

U.S. PATENT DOCUMENTS

| | | | |
|---|---|---|---|
| 6,445,679 B1* | 9/2002 | Taniguchi et al. | 370/232 |
| 6,879,926 B2* | 4/2005 | Schmit et al. | 702/123 |
| 6,910,024 B2* | 6/2005 | Krishnamurthy et al. | 705/400 |
| 7,376,083 B2* | 5/2008 | Ignatowski et al. | 370/232 |
| 2002/0116479 A1* | 8/2002 | Ishida et al. | 709/220 |
| 2002/0154649 A1 | 10/2002 | Takase et al. | |
| 2003/0033347 A1* | 2/2003 | Bolle et al. | 709/107 |
| 2003/0061356 A1* | 3/2003 | Jason, Jr. | 709/227 |
| 2003/0177165 A1* | 9/2003 | Bradley et al. | 709/105 |
| 2003/0187533 A1* | 10/2003 | Ichikawa | 700/106 |
| 2004/0169484 A1* | 9/2004 | Iribe et al. | 318/568.11 |
| 2004/0186614 A1* | 9/2004 | Yamaguchi et al. | 700/179 |
| 2004/0260514 A1* | 12/2004 | Beaudoin et al. | 702/182 |
| 2005/0091657 A1* | 4/2005 | Priem | 718/104 |

FOREIGN PATENT DOCUMENTS

| | | |
|---|---|---|
| JP | 2002-202959 | 7/2002 |
| JP | 2002-252629 | 9/2002 |
| JP | 2004-56328 | 2/2004 |

OTHER PUBLICATIONS

Abhishek Chandara, Wibo Gong and Prashant Shnoy, "Dynamic Resource Allocation for Shared Data Centers Using Online Measurements", (online), Department of Computer Science, University of Massachusetts Amherst, (retrieved on Jan. 30, 2004), Internet <URL: http://lass.cs.umass.edu/~abhishek/papers/iwogos03/paper.pdf>.

Sally Floyd and Van Jacobson, "Random Early Detection Gateways for Congestion Avoidance", (online), Lawrence Berkeley Laboratory, University of California, (retrieved on Nov. 30, 2004), Inernet <URL: http://www.icir.org/floyd/papers/early.twocolumn.pdf>.

* cited by examiner

FIG. 4

MEASURED VALUE STORAGE UNIT 141

| MEASUREMENT ITEM | MEASURED APPARATUS | MEASUREMENT TIME | MEASURED VALUE |
|---|---|---|---|
| QUEUE LENGTH | SERVER $3_1$ | 13:52:30 | 0.43 |
| QUEUE LENGTH | SERVER $3_2$ | 13:52:30 | 0.82 |
| QUEUE LENGTH | SERVER $3_3$ | 13:52:30 | 0.48 |
| QUEUE LENGTH | SERVER $3_1$ | 13:52:40 | 0.67 |
| ⋮ | ⋮ | ⋮ | ⋮ |

FIG. 5

RULE INFORMATION STORAGE UNIT 142

| |
|---|
| FLUCTUATION CALCULATION RULE INFORMATION — 1421 |
| FLUCTUATION CALCULATION RULE STATIC PARAMETER INFORMATION — 1422 |
| SYMPTOM STATE JUDGMENT RULE INFORMATION — 1423 |
| SYMPTOM STATE JUDGMENT RULE STATIC PARAMETER INFORMATION — 1424 |
| STATIC PARAMETER CALCULATION RULE INFORMATION — 1425 |

FIG. 6

FLUCTUATION CALCULATION RULE INFORMATION 1421

```
FUNCTION FLUCTUATION CALCULATION FUNCTION (MEASURED_VALUE_DATA){
    //   FLUCTUATION IS THE NUMBERS OF MEASURED VALUES THAT
    //   ARE OR HAVE BEEN LARGER THAN OR EQUAL TO A THRESHOLD
    COUNT ++
    LAST_MEASURED_VALUE = 0
    FOR (I = 1; I < MEASURED_VALUE_DATA.LENGTH; J ++){
        IF (THRESHOLD_EXCESS_JUDGMENT(MEASURED_VALUE_DATA[I]) ||
            TRESHOLD_EXCESS_JUDGMENT(LAST_MEASURED_VALUE){
            COUNT ++
        }
    }
    RETURN COUNT;
}                                                              }14210

FUNCTION THRESHOLD_EXCESS_JUDGMENT(MEASURED_VALUE){
    IF (MEASURED_VALUE >= THRESHOLD){
        RETURN TRUE;
    } ELSE {
        RETURN FALSE;         14212
    }
}                                                              }14211
```

FIG. 7

SYMPTOM STATE JUDGMENT RULE INFORMATION 1423

```
FUNCTION HIGH_LOAD_JUDGMENT_FUNCTION(FLUCTUATION){
    // WHEN FLUCTUATION IS LARGER THAN OR EQUAL
    // TO THRESHOLD, JUDGMENT OF HIGH LOAD IS OUTPUTTED
    IF (FLUCTUATION >= THRESHOLD){
        RETURN TRUE;
    } ELSE {
        RETURN FALSE;    14232
    }
}
```

FIG. 8

STATIC PARAMETER CALCULATION RULE INFORMATION 1425

```
FUNCTION STATIC_PARAMETER_CALCULATION_FUNCTION(SERVER_CONFIGURATION_INFORMATION){
    // STATIC PARAMETER (THRESHOLD) FOR FLUCTUATION CALCULATION
    // RULE IS CALCULATED BASED ON CPU_CLOCK AND
    // NUMBER_OF_CPUS.
    THRESHOLD = 3.3
        * SERVER_CONFIGURATION_INFORMATION>CPU_CLOCK/1000
        * SERVER_CONFIGURATION_INFORMATION>NUMBER_OF_CPUS;
    RETURN THRESHOLD;
}
```

FIG. 9

CONFIGURATION INFORMATION STORAGE UNIT 143

| SERVER ID | CONFIGURATION INFORMATION | | | | | LOAD BALANCER ID |
|---|---|---|---|---|---|---|
| | CPU TYPE | NUMBER OF CPUS | CPU CLOCK | MOUNTED MEMORY CAPACITY | BUS CLOCK | |
| SERVER $3_1$ | SH-8 | 2 | 300MHz | 512MHz | 400MHz | BALANCER $2_1$ |
| SERVER $3_2$ | SH-8 | 1 | 300MHz | 512MHz | 400MHz | BALANCER $2_1$ |
| SERVER $3_3$ | SH-8 | 2 | 400MHz | 512MHz | 400MHz | |
| SERVER $3_4$ | SH-9 | 1 | 400MHz | 512MHz | 400MHz | BALANCER $2_3$ |

1431, 1432, 1433, 1430

THRESHOLD CALCULATION PROCESSING S11

FLUCTUATION CALCULATION PROCESSING S12

LOAD STATE MONITORING APPARATUS AND LOAD STATE MONITORING METHOD

The present application claims priority from Japanese application JP 2004-370389 filed on Dec. 22, 2004, the content of which is hereby incorporated by reference into this application.

BACKGROUND OF THE INVENTION

The present invention relates to a technique of monitoring a load state, and in particular, to a technique of detecting a symptom of transition of an information processing apparatus to a high load state.

There are known techniques of measuring performance information of an information processing apparatus to monitor a load state of the information processing apparatus and to control the load of the information processing apparatus based on the monitoring result.

For example, Abhishek Chandara, Wibo Gong and Prashant Shnoy, "Dynamic Resource Allocation for Shared Data Centers Using Online Measurements", [online], Department of Computer Science, University of Massachusetts Amherst, [retrieved on Jan. 30, 2004], (hereinafter referred to as Non-patent Document 1) discloses a load management system in which a load is monitored by measuring an average queue length as performance information for each application, and computing resources are reallocated to applications based on increase or decrease of their loads. Operation of this load management system is outlined as follows.

(A-1) A queue length is measured for each application running on an information processing apparatus, and an average value per unit time is calculated.

(A-2) Based on the average value of queue length, which has been calculated in (A-1) for each application, a response time, extending from input of a request into the application to output of a response to that request, is estimated.

(A-3) The response time estimated in (A-2) for each application is substituted into a prescribed evaluation function, to recalculate the computing resource quantity allocated to each application.

(A-4) A computing resource of the new quantity obtained in (A-3) is allocated to each application.

In detail, a computing resource means a CPU operating time, a usable memory capacity, and the like allocated to an application.

Further, Sally Floyd and Van Jacobson, "Random Early Detection Gateways for Congestion Avoidance", [online], Lawrence Berkeley Laboratory, University of California, [retrieved on Nov. 30, 2004], (hereinafter referred to as Non-patent Document 2) discloses a gateway device that uses a packet control system called RED (Random Early Detection). RED measures an average value per unit time of the queue length of a buffer in the gateway device so as to monitor the load state of the gateway device, and rejects packets before the gateway device gets into a high load state. Frequently, a high load state of a gateway device occurs when a specific sender sends a large amount of packets in a short period of time. Thus, if rejection of packets starts after a gateway device gets into a high load state, packets from a specific sender are rejected intensively. RED can prevent concentration of rejected packets on a specific sender, by starting rejection of packets before a gateway device gets into a high load state.

Further, Japanese Non-examined Patent Laid-open No. 2002-252629 (hereinafter referred to as Patent Document 1) discloses a packet processing device that determines a VoQ (Virtual Output Queue) to which a right of sending packets to a cross bus switch is given, based on packet sending intervals and queue lengths of VoQs. According to this packet processing device, buffer overflow under a load imbalance can be suppressed by suppressing a delay time of a high load queue, and on the other hand, a low load queue can send packets without being affected by a high load queue.

Further, Japanese Non-examined Patent Laid-open No. 2004-56328 (hereinafter referred to as Patent Document 2) discloses a router that considers a queue length in performing controls when it notifies an available band to a user, so that it can notify occurrence of congestion in a short time. When the router receives control packets sent by a user to grasp a current state of a network, the router measures a queue length of a buffer of each priority class i. In the case where the queue length of the buffer of the priority class i is less than or equal to a threshold, a previously-calculated available band for the priority class i is notified as an available band for the priority class i to the user. On the other hand, in the case where the measured queue length of the buffer of the priority class i is larger than the threshold, 0 is notified as the available band for the priority class i to the user.

In all the above-described techniques, a queue length is measured as performance information of an information processing apparatus, and an average value (per a prescribed time) of measurement results is compared with a pre-set threshold (even in the case where a measurement result is used as it is, the measurement result can be taken as an average value per a measurement time interval), and load control processing is started when the average value exceeds the threshold. As in the case of the technique described in Non-patent Document 2, it is preferable for efficient load control that load control processing is started before an information processing apparatus gets into a high load state.

However, performance information such as a queue length or a response time shows a property (referred to as a burst) that it becomes rapidly worse when a load state of an information processing apparatus exceeds some value. In other words, a range of queue lengths corresponding to a load state (referred to as a symptom state) positioned between a high load state and a low load state is narrow. Accordingly, for the conventional techniques that compare an average value of measured values of performance information such as a queue length or a response time with a threshold, it is difficult to detect the symptom state with high precision, owing to a burst of the performance information. As a result, sometimes load control is started after a high load state occurs, or still in a low load state.

The present invention has been made taking the above situation into consideration. An object of the invention is to detect a symptom state in which a low load state shifts to a high load state.

SUMMARY OF THE INVENTION

To solve the above problem, the present invention detects a symptom state of an information processing apparatus by measuring performance information of the information processing apparatus, calculating a fluctuation of measured values in a given time, and comparing the fluctuation with a threshold.

For example, a load monitoring apparatus according to the present invention is a load monitoring apparatus for monitoring a load state of an information processing apparatus, comprising: a measured value storing means which stores both measured value and measurement time of performance information of the information processing apparatus; a fluctuation calculation means which reads a plurality of measured values measured in a given time from the measured value storing means, and calculates a fluctuation of the plurality of measured values; and a load state judgment means which compares the fluctuation calculated by the fluctuation calculation means with a given load state judgment threshold, to judge the load state of the information processing apparatus.

The inventors of the present invention have found that, as for performance information showing a burst such as a queue length, a response time, or the like, a difference between a fluctuation per a given time of measured values of the performance information in the low load state and a fluctuation per the given time of measured values of the performance information in the symptom state is larger than a difference between an average value per the given time of measured values of the performance information in the low load state and an average value per the given time of measured values of the performance information in the symptom state. Accordingly, using a fluctuation, it is possible to detect a symptom state of an information processing apparatus more accurately.

BRIEF DESCRIPTION OF THE DRAWINGS

FIG. 4 is a diagram showing an example of registration in a measured value storage unit 141;

FIG. 5 is a diagram showing an example of registration in a rule information storage unit 142;

FIG. 6 is a diagram showing an example of fluctuation calculation rule information 1421;

FIG. 7 is a diagram showing an example of symptom state determination rule information 1423;

FIG. 8 is a diagram showing an example of static parameter calculation rule information 1425;

FIG. 9 is a diagram showing an example of registration in a configuration information storage unit 143;

DETAILED DESCRIPTION

<Performance Information Showing Burst>

First, prior to describing one embodiment of the present invention, will be described performance information that shows a burst and is used for monitoring a load state in this embodiment, taking a queue length as an example.

Generally, an information processing apparatus such as a router has a queue for temporarily storing received processing requests before processing the requests. A processing request stored in the queue is fetched from the queue and processed at a point when a free calculation resource is generated. The number of processing requests existing in the queue is a queue length.

From the queuing theory, it is known that a queue length shows a burst. Hereinafter, a queue length is written as L, the number of processing requests processed by an information processing apparatus per unit time as $\mu$, the number of processing requests arriving per unit time as $\lambda$, and a ratio ($=\lambda/\mu$) of $\lambda$ to $\mu$ as $\rho$. The ratio $\rho$ indicates a load state of the information processing apparatus.

Figure 1:
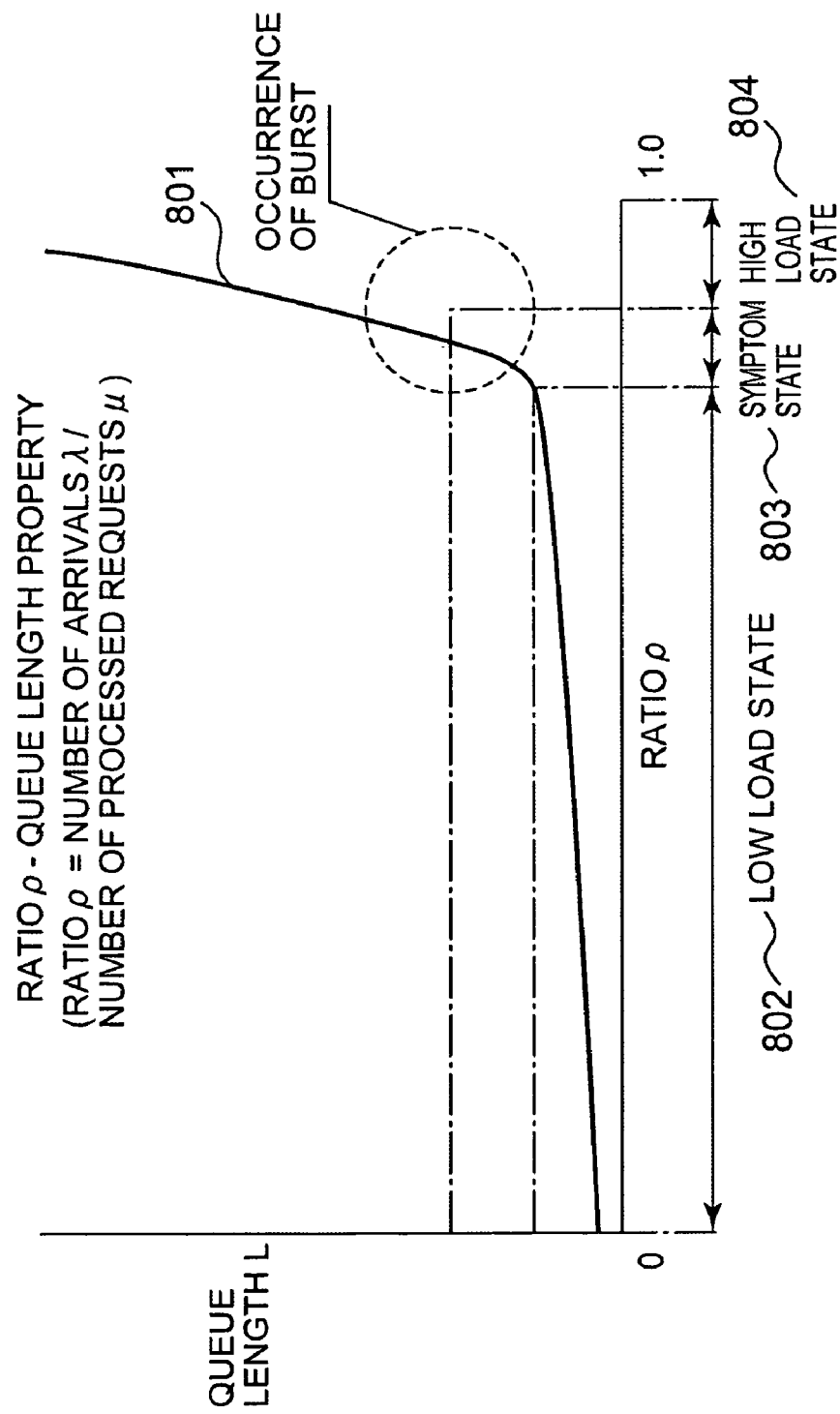
FIG. 1 is a diagram showing schematically a relation between a ratio ρ of the number λ of requests arriving at an information processing apparatus to the number μ of requests processed by the information processing apparatus and a queue length L.

FIG. 1 is a diagram showing schematically a relation between the ratio $\rho$ of the number $\lambda$ of requests arriving at an information processing apparatus to the number $\mu$ of requests processed and a queue length L. As obviously seen from the graph 801 shown in FIG. 1, the queue length L has the following properties.

(B-1) The queue length L is proportional to the ratio $\rho$.

(B-2) When a value of the ratio $\rho$ is close to 0 (a low load state 802), change of the queue length L is small in relation to change of the ratio $\rho$.

(B-3) As the ratio $\rho$ closes to 1, namely as the number $\lambda$ of arriving requests is close to the number $\mu$ of processed requests, the queue length L increases. When the ratio $\rho$ exceeds a given value (a symptom state 803), change of the queue length L in relation to the change of the ratio $\rho$ becomes larger than the case of the low load state 802.

(B-4) When a value of the ratio $\rho$ closes to 1 further (a high load state), change of the queue length L becomes extremely larger in relation to change of the ratio $\rho$. Namely, the queue length L shows a burst.

In the low load state 802, the number of processing requests arriving at the information processing apparatus is small-on average. Accordingly, in the low load state 802, the ratio $\rho$ varies in a small range of values. In this case, change of the ratio $\rho$ appears as fluctuation in a range of small values of the queue length L.

On the other hand, in the symptom state 803, the number of processing request arriving at the information processing apparatus becomes larger. Accordingly, sometimes the value of the ratio $\rho$ becomes larger so as to enter into the range in which a burst occurs. At that time, the value of the queue length L is large in the case where a burst has occurred, and otherwise small. Thus, the queue length L varies more largely than in the low load state.

Figure 2A:
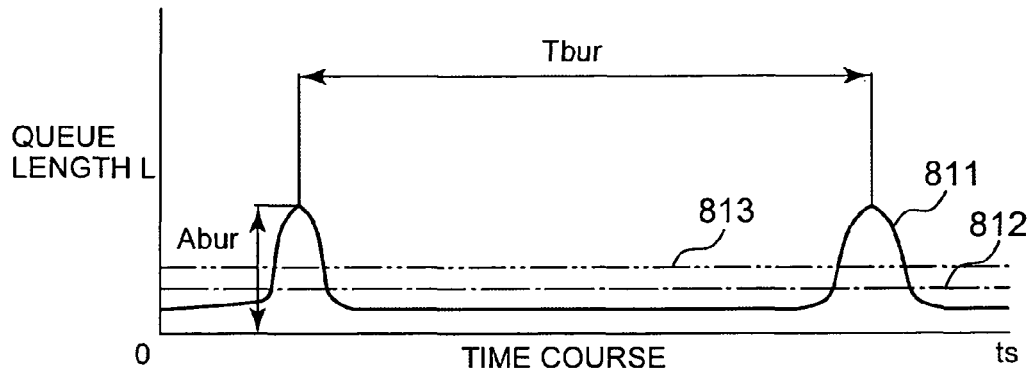
FIG. 2 is a diagram showing schematically change of a queue length L in a given time ts, FIG. 2(A) showing change of the queue length L in the time ts in a low load state, FIG. 2(B) change of the queue length L in the time ts in a symptom state, and FIG. 2(C) change of the queue length L in the time ts in a high load state.
Figure 2B:
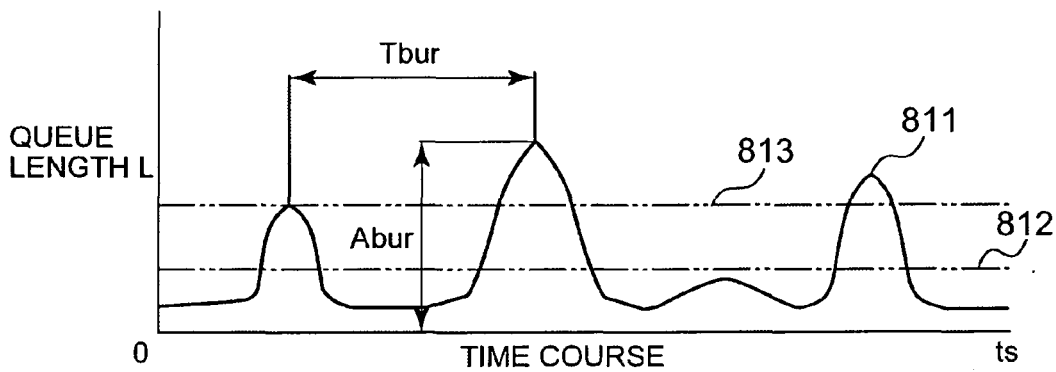
Figure 2C:
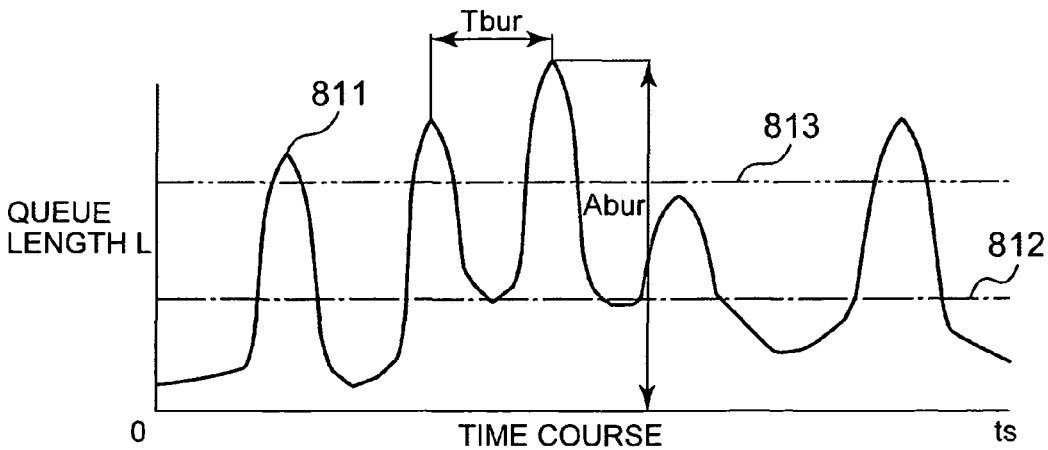

FIG. 2 is a diagram showing schematically change of the queue length in a given time ts, FIG. 2($a$) showing change of the queue length L in the time ts in the low load state, FIG. 2($b$) change of the queue length in the time ts in the symptom state, and FIG. 2(C) change of the queue length L in the time ts in the high load state. Here, a solid line 811 shows change of the queue length L in the time ts, a one-dot chain line 812 an average value of the queue length L in the time ts, and a two-dot chain line 813 a fluctuation of the queue length L in the time ts.

In the symptom state of the information processing apparatus (FIG. 2(B)), the number of bursts occurring in the given time ts is small. As a result, an average value 812 of the queue length L in the time ts is not so much different between the symptom state and the low load state (FIG. 2(A)) of the information processing apparatus. Accordingly, in the case of a method of comparing an average value 812 of the queue length L in the time ts with a threshold, it is difficult to judge difference accurately between the low load state and the symptom state of the information processing apparatus.

However, as obviously seen from FIGS. 2(A)-2(C), as the information processing apparatus is in a higher load state, intervals Tbur between bursts become shorter (namely, a frequency of bursts occurrence in the given time ts becomes larger) and amplitudes Abur of bursts (i.e., queue lengths L at burst times) become larger. Further, burst intervals Tbur and burst amplitudes Abur are obviously different between the low load state and the symptom state of the information processing apparatus. As a result, in comparison with the average value 812, there is a larger difference (i.e., a significant difference) in the fluctuation 813 of the queue lengths L in the time ts, between the symptom state and the low load state of the information processing apparatus. Such a characteristic is not limited to a queue length, but common to other kinds of performance information showing a burst such as a response time, for example.

Thus, in the present embodiment, performance information showing a burst is measured to calculate a fluctuation of measured values per given time. Then, the fluctuation is compared with a threshold, to detect a symptom state of an information processing apparatus.

Embodiment

Now, an embodiment of the present invention will be described taking the case where performance information as an object of measurement is a queue length.

Figure 3:
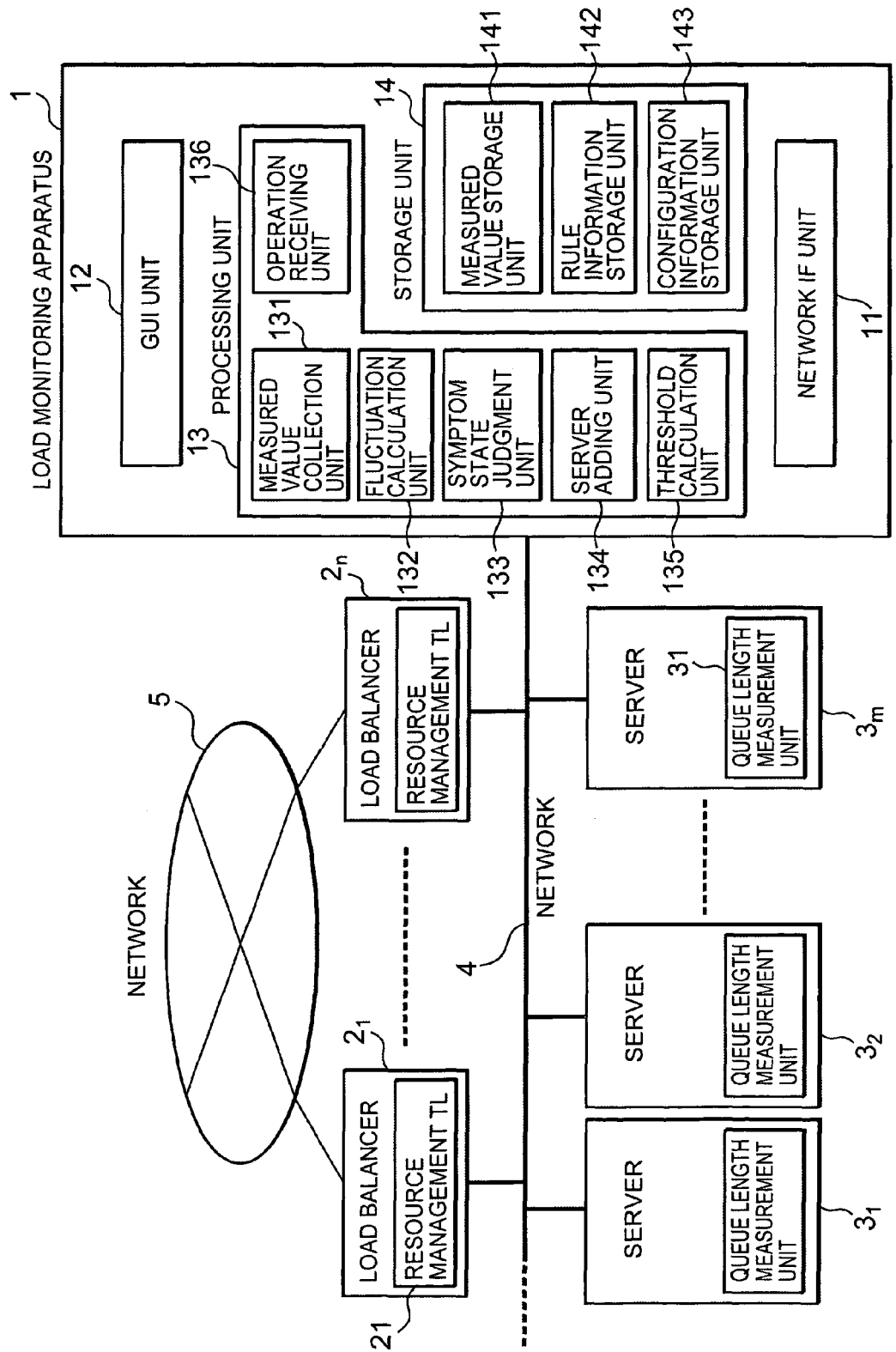
FIG. 3 is a schematic diagram showing a load monitoring system to which one embodiment of the present invention is applied.

FIG. 3 is a schematic diagram showing a load monitoring system to which an embodiment of the present invention is applied. As shown in the figure, the load monitoring system of the present embodiment comprises a load monitoring apparatus 1, a plurality of load balancers $2_1$-$2_n$ (which, hereinafter, may be simply referred to as a load balancer 2 representatively) and a plurality of servers $3_1$-$3_m$ (which, hereinafter, may be simply referred to as a server 3 representatively), these components being connected with one another through a network 4 such as a LAN.

A load balancer 2 together with at least one server 3 forms a load distribution system. A load balancer 2 has a resource management TL (table) 21 that registers information on the servers 3 available to the load balancer 2 itself. A load balancer 2 receives a request sent through a network 5 such as Internet, and sends the request to a server 3 whose load is lower among the servers 3 registered in the resource management TL 21, to make the server 3 in question process the request. Then, receiving a processing result from the server 3 in question, the load balancer 2 sends the result to the client (not shown), i.e., the sender of the request through the network 5.

A server 3 processes a request received from a load balancer 2, and returns a processing result to the load balancer as the sender of the request in question. Further, a server 2 has a queue length measurement unit 31 that serially measures a queue length L, i.e., the number of requests 2 (received from a load balancer 2) existing in a queue. The queue length measurement unit 31 generates measured value information for each measured value of queue length L by adding additional information including identification information of a measurement item (i.e., the queue length L), a measurement time and identification information of the server 3 itself (i.e., the server 3 whose queue length L has been measured) to a measured value. The measured value information is sent to the load balancer 2 of the load distribution system to which the server 3 belongs and to the load monitoring apparatus 1.

Other functions of a load balancer 2 and a server 3 are fundamentally similar to a load balancer and a server used in a conventional load distribution system, and their detailed description is omitted here.

The load monitoring apparatus 1 calculates a fluctuation of measured values of the queue length L per given time for each server 3, based on the measured value information sent from that server 3. Then, based on the fluctuation of each server 3, the load monitoring apparatus 1 detects servers 3 that are in the high load state or the symptom state (i.e., the state of transition from the low load state to the high load state). When the load monitoring apparatus 1 detects a server 3 that is in the high load state or the symptom state, the load monitoring apparatus registers information of the server 3 as a new server, into the resource management TL 21 of the load balancer 2 of the load distribution system to which the server 3 in question belongs. As a result, processing performance of the load distribution system to which the server 3 in the high load state or the symptom state belongs is enhanced, and the load of the server 3 in question is lowered.

As shown in the figure, the load monitoring apparatus 1 comprises a network IF unit 11 for connecting with the network 4, a GUI (Graphical User Interface) unit 12, a processing unit 13 and a storage unit 14.

The storage unit 14 comprises a measured value storage unit 141, a rule information storage unit 142 and a configuration information storage unit 143.

The measured value storage unit 141 stores measured value information sent from each server 3. FIG. 4 is a diagram showing an example of registration in the measured value storage unit 141. As shown in the figure, the measured value storage unit 141 registers a record 1410 for each piece of measured value information sent from a server 3. A record 1410 has a field 1411 for registering a measurement item, a field 1412 for registering identification information of a measured apparatus, a field 1413 for registering a measurement time, and a field for registering a measured value.

The rule information storage unit 142 stores rules and parameters used for processing in the processing unit 13. FIG. 5 is a diagram showing an example of registration in the rule information storage unit 142. As shown in the figure, the rule information storage unit 142 stores fluctuation calculation rule information 1421, fluctuation calculation rule static parameter information 1422, symptom state judgment rule information 1423, symptom state judgment rule static parameter information 1424, and static parameter calculation rule information 1425.

The fluctuation calculation rule information 1421 is description (a script) of a procedure used for calculating a fluctuation (per given time) of measured values of a queue length L. This procedure is described in a format that can be interpreted (executed) by a fluctuation calculation unit 132 described below. FIG. 6 is a diagram showing an example of the fluctuation calculation rule information 1421. In the figure, the description part indicated by the reference numeral 14210 has an array of measured values as its argument, and outputs, as a fluctuation, the number of pairs of measured values, with both measured values of each pair being consecutively stored in the array and judged to be "true" by threshold excess judgment. Further, the description part indicated by the reference numeral 14211 performs the threshold excess judgment, and judges a measured value to be "true"

when a measured value is larger than or equal to a threshold 14212 and to be "false" when a measured value is less than the threshold 14212.

The fluctuation calculation rule static parameter information 1422 is specific numerical information of the parameter described in the fluctuation calculation rule information 1421. In the case of FIG. 6, a numeric value set as the threshold 14212 corresponds to the fluctuation calculation rule static parameter information 1422.

The symptom state judgment rule information 1423 is description (a script) of a procedure used for finding that a server 2 is in the symptom state or the high load state. This procedure is described in a format that can be interpreted (executed) by a symptom state judgment unit 133 described below. FIG. 7 is a diagram showing an example of the symptom state judgment rule information 1423. In this example, an argument of the procedure is a fluctuation, and the judgment is "true" when the value of the fluctuation is more than or equal to a threshold 14232 and "false" when the value of the fluctuation is less than the threshold 14232.

The symptom state judgment rule static parameter information 1424 is specific numerical information of the parameter described in the symptom state judgment rule information 1423. In the case of FIG. 7, a numeric value set as the threshold 14232 corresponds to the symptom state judgment rule static parameter information 1424.

The static parameter calculation rule information 1425 is description (a script) of a procedure used for calculating the fluctuation calculation rule static parameter information 1422 and the symptom state judgment rule static parameter information 1424. This procedure is described in a format that can be interpreted (executed) by a threshold calculation unit 135 described below. FIG. 8 is a diagram showing an example of the static parameter calculation rule information 1425. This figure gives an example of description of a procedure used for calculating the fluctuation calculation rule static parameter information 1422. The procedure shown in the figure has, as its arguments, a CPU clock frequency and the number of CPUs in the below-described configuration information of a server 3, and sets the fluctuation calculation rule static parameter information 1422 to a value obtained by multiplication of the CPU clock frequency, the number of CPUs and a given coefficient (here, 3.3/1000).

The configuration information storage unit 143 stores configuration information of a server 3 and information for specifying a load distribution system to which the server 3 in question belongs, for each server 3. FIG. 9 is a diagram showing an example of registration in the configuration information storage unit 143. As shown in the figure, the configuration information storage unit 143 registers a record 1430 for each server 3. A record 1430 has a field 1431 for registering identification information (for example, an address) of a server 3, a field 1432 for registering configuration information of the server 3, and, when the server 3 belongs to a load distribution system, a field 1433 for registering identification information (for example, an address) of the load balancer 2 of that load distribution system. As the configuration information of a server 3, the field 1432 has a subfield for registering a CPU type, a subfield for registering the number of CPUs, a subfield for registering a CPU clock frequency, a subfield for registering a mounted memory capacity, and a subfield for registering a bus clock frequency. When a server 3 does not belong to any load distribution system, the field 1433 registers information indicating to that effect, for example a null code.

Returning to FIG. 3, description will be continued. The processing unit 13 comprises a measured value collection unit 131, the fluctuation calculation unit 132, the symptom state judgment unit 133, a server adding unit 134, the threshold calculation unit 135 and an operation receiving unit 136.

When the measured value collection unit 131 receives measured value information from a server 3 through the network IF unit 11, the measured value collection unit 131 adds a new record 1410 to the measured value storage unit 141, and registers the measurement item name (i.e., queue length), the identification information of the server 3, the measurement time and the measured value included in the measured value information received into the fields 1411, 1412, 1413 and 1414 of the record 1410. Here, the measured value collection unit 131 may periodically issue an acquisition request to the queue length measurement unit 31 of each server 3, to acquire measured value information from the queue length measurement unit 31 of each server 3. Or, the queue length measurement unit 31 of each server 3 may refer to serially-measured values, and generate measured value information including a measured value only when that measured value satisfies prescribed conditions, to send immediately the generated measured value information to the load monitoring apparatus 1.

The fluctuation calculation unit 132 reads the fluctuation calculation rule information 1421 and the fluctuation calculation rule static parameter information 1422 from the rule information storage unit 142. Then, the fluctuation calculation unit 132 replaces the given parameter in the fluctuation calculation rule information 1421 with the numeric information shown in the fluctuation calculation rule static parameter information 1422. Further, for each server 3, the fluctuation calculation unit 132 reads measured values that have been measured within a given time (for example, extending from one minute ago to the present) from the measured value storage unit 141. Then, according to the fluctuation calculation rule information 1421 with given parameter being replaced with the numeric information indicated in the fluctuation calculation rule static parameter information 1422, the fluctuation calculation unit 132 calculates a fluctuation of those measured values that have been measured within the given time and read from the measured value storage unit 141. As a fluctuation of measured values, there are three types, i.e., a higher moment, an out-of-threshold count, and a high frequency component.

(C-1) Higher Moment

In the case where a higher moment such as a variance or a standard deviation of measured values that have been measured within the given time is used as a fluctuation, the procedure described by the fluctuation calculation rule information 1421 and used by the fluctuation calculation unit 132 is as follows. Namely, an argument of the procedure is a plurality of measured values measured within the given time, and the procedure substitutes the argument into an equation for calculating a higher moment such as a variance or a standard deviation, and outputs the calculation result as a fluctuation. In the case where a higher moment such as a variance or a standard deviation is used as a fluctuation, the fluctuation calculation rule static parameter information 1422 can be dispensed with. Or, it is possible to calculate an average value of measured values measured within the given time, to output an addition of the average value and a higher moment as a fluctuation.

(C-2) Out-of-Threshold Count

In the case where the number of measured values exceeding a threshold (referred to as an out-of-threshold count) is used as a fluctuation, the procedure described by the fluctuation calculation rule information 1421 and used by the fluctuation calculation unit 132 is as follows. Namely, an argument of the procedure is an array of a plurality of measured values that have been measured within the given time, and the procedure counts the number of measured values that exceeds a threshold indicated by the fluctuation calculation rule static parameter information 1422 and outputs the count result as a fluctuation.

Figure 10A:
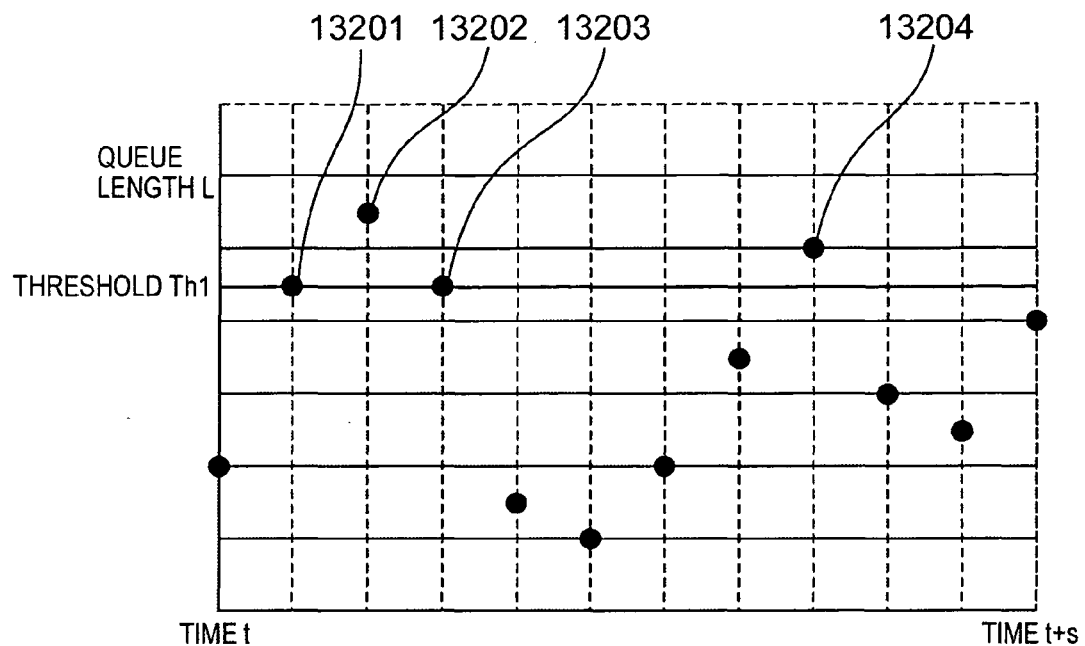
FIG. 10(A) is a diagram for explaining an example of an out-of-threshold count.

FIG. 10(A) is a diagram for explaining an example of out-of-threshold count, showing measured values of the queue length L measured in a server 3 from a time t to a time t+s (the given time=s). In the figure, a threshold Th1 is a threshold indicated by the fluctuation calculation rule static parameter information 1422. In this example, measured values larger than or equal to the threshold are indicated by four reference numerals 13201, 13202, 13203 and 12304. In the case of the fluctuation calculation rule information 1421 shown in FIG. 6, the out-of-threshold count is incremented by one when consecutive two measured values are larger than or equal to the threshold Th1. Two consecutive measured values are larger than or equal to the threshold Th1 in the two pairs of measured values, i.e., the pair 13201 and 13202 and the pair 13202 and 13203. Thus, the out-of-threshold count is 2.

Here, not the number of pairs of consecutively-measured values larger than or equal to the threshold Th1 but the number itself of measured values larger than or equal to the threshold Th1 may be employed as the fluctuation. Or, a ratio of the number of measured values larger than or equal to the threshold Th1 to the number of measured values measured in the given time may be employed as the fluctuation. Or, in the given time, a ratio of a length of times during which measured values are larger than or equal to the threshold Th1 to the entire length of the given time may be employed as the fluctuation.

Figure 10B:
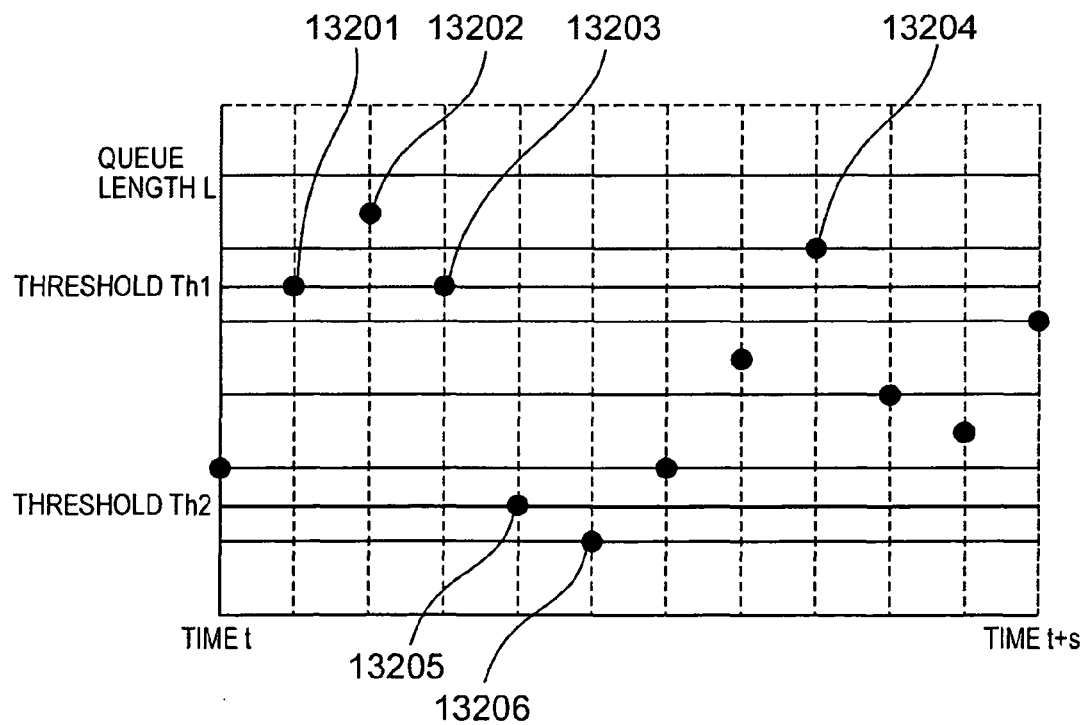
FIG. 10(B) is a diagram for explaining another example of the out-of-threshold count.

FIG. 10(B) is a diagram for explaining another example of the out-of-threshold count, showing measured values of the queue length L measured in a server from a time t to a time t+s (the given time=s). In the figure, thresholds Th1 and Th2 are thresholds (Th1>Th2) indicated by the fluctuation calculation rule static parameter information 1422. In this example, not only measured values larger than or equal to the threshold Th1 but also measured values smaller than or equal to the threshold Th2 are counted into the out-of-threshold count. Thus, in the case shown in FIG. 10(B), measured values 13201, 13202, 13203, 13204, 13205 and 13206 are counted into the out-of-threshold count, and the out-of-threshold count becomes 6.

(C-3) High Frequency Component

As described referring to FIG. 2, as for a measured value of performance information (such as a queue length or response time) showing a burst, an amplitude Abur of a measured value at a burst becomes larger and a burst interval Tbur becomes shorter as a load becomes higher. Thus, as a fluctuation, a frequency of measured values having amplitudes larger than or equal to a given threshold can be used as a fluctuation. In that case, the fluctuation calculation rule information 1421 describes the following procedure for the fluctuation calculation unit 132. Namely, the procedure transforms a plurality of measured values measured in a given time into a frequency spectrum, using a conventional technique such as Fourier transform, and detects all frequency components having absolute values (amplitudes) larger than or equal to a threshold indicated by the fluctuation calculation rule static parameter information 1422, from the frequency spectrum, and outputs a group of the detected frequency components as a fluctuation.

The symptom state judgment unit 133 reads the symptom state judgment rule information 1423 and the symptom state judgment rule static parameter information 1424 from the rule information storage unit 142. Then, the symptom state judgment unit 133 replaces a given parameter in the symptom state judgment rule information 1423 with numeric information indicated by the symptom state judgment rule static parameter 1424. Then, according to the symptom state judgment rule information 1423 whose given parameter has been replaced with the numeric information indicated by the symptom state judgment rule static parameter information 1424, the symptom state judgment unit 133 judges whether a server 3 is in the symptom state or the high load state, based on the fluctuation of the server 3.

For example, in the case where a higher moment of measured values measured in a given time or an addition of the higher moment and an average value of the measured values measured in the given time is outputted as a fluctuation of a server 3 from the fluctuation calculation unit 132, the symptom state judgment unit 133 judges that the server 3 is in the symptom state or the high load state when the higher moment or the addition of the higher moment and the average value is larger than or equal to a given threshold.

Further, for example, in the case where an out-of-threshold count of measured values measured in a given time is outputted as a fluctuation of a server 3 from the fluctuation calculation unit 132, the symptom state judgment unit 133 judges that the server 3 is in the symptom state or the high load state when the out-of-threshold count is larger than or equal to a given threshold.

Further, for example, in the case where a group of frequency components indicating a frequency of measured values having amplitude larger than or equal to a given value is outputted as a fluctuation of a server 3 from the fluctuation calculation unit 132, the symptom state judgment unit 133 judges that the serve 3 is in the symptom state or the high load state when the group includes a frequency component having a frequency larger than or equal to a given threshold. Or, the symptom state judgment unit 133 judges that the server 3 is in the symptom state or the high load state when the total number of frequency components included in the group is larger than or equal to a given threshold. Or, the symptom state judgment unit 133 judges that the server 3 is in the symptom state or the high load state, when each frequency component included in the group is converted into a predetermined numerical value such that the numerical value is larger as a frequency of the frequency component is higher and then the sum of the converted numerical values is larger than or equal to a given threshold.

The server adding unit 134 searches the configuration information storage unit 143 for a record (referred to as a symptom state/high load state server record) 1430 of a server 3 that has been judged to be in the symptom state or the high load state by the symptom state judgment unit 133. Further, the server adding unit 134 searches the configuration information storage unit 143 for a record (referred to as an adding object server record) 1430 whose field 1433 registers the information indicating that the server 3 concerned does not belong to any load distribution system. Then, through the network IF unit 11, the server adding unit 134 accesses the load balancer 2 whose identification information is registered in the field 1433 of the symptom state/high load state server record, and registers the server identification information registered in the field 1431 of the adding object server record into the resource management TL 21 of the load balancer 2 in question. As a result, a new server 3 has been added to the load distribution system to which the server 3 judged to be in the symptom state or the high load state system belongs.

Further, the server adding unit 134 displays, on the GUI unit 12, the information (specified by the symptom state/high load state server record) on the server 3 in the symptom state or the high load state and the information (specified by the adding object server record) on the server 3 added to the load distribution system to which the server 3 judged to be in the symptom state or the high load state belongs.

The threshold calculation unit 135 reads the static parameter calculation rule information 1425 from the rule information storage unit 142, and reads the record 1430 of the server 3 in question from the configuration information storage unit 143. Then, according to the static parameter calculation rule information 1425, the threshold calculation unit 135 calculates the fluctuation calculation rule static parameter information 1422 and/or the symptom state judgment rule static parameter information 1424 corresponding to the performance of the server 3 in question. Then, the threshold calculation unit 135 replaces the fluctuation calculation rule static parameter information 1422 and/or the symptom state judgment rule static parameter information 1424 registered in the rule information storage unit 142 with the new-calculated fluctuation calculation rule static parameter information 1422 and/or the new-calculated symptom state judgment rule static parameter information 1424.

According to an instruction received from a user through the GUI unit 12, the operation receiving unit 136 displays the registration in the storage unit 14 or changes the registration in the storage unit 14.

Figure 11:
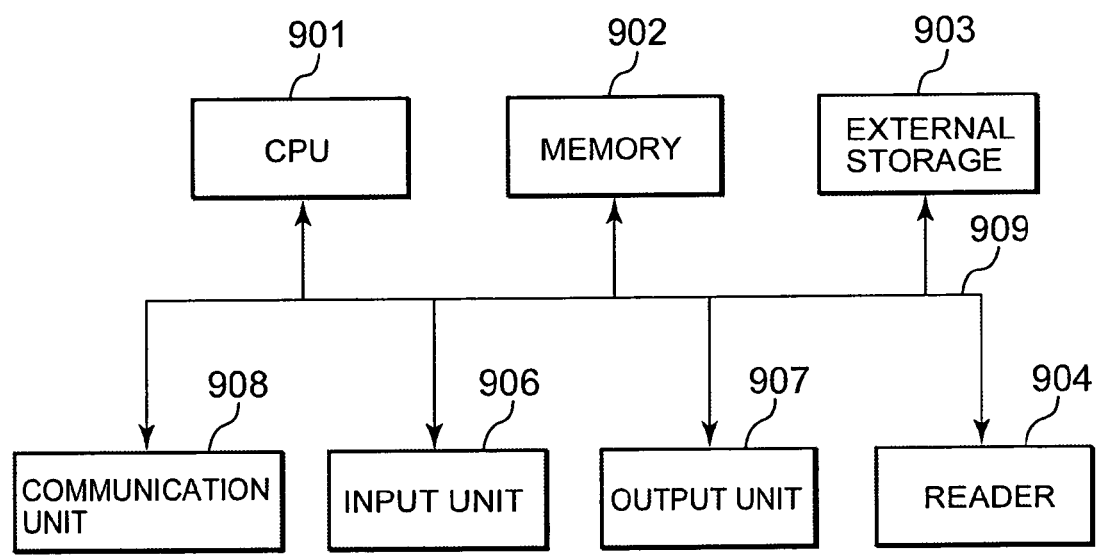
FIG. 11 is a diagram showing a hardware configuration of a load monitoring apparatus 1.

The load monitoring apparatus 1 of the above-described configuration can be implemented on an ordinary computer system comprising, for example as shown in FIG. 11, a CPU 901, a memory 902, an external storage 903 such as a HDD, a reader 904 for reading data from a storage medium such as a CD-ROM, a DVD-ROM or an IC card, an input unit 906 such as a keyboard or a mouse, an output unit 907 such as a monitor or a printer, a communication unit 908 for connecting with the network 4, and a bus 909 for connecting the above-mentioned components, when the CPU 901 executes a program loaded onto the memory 902. This program may be downloaded into the external storage 903 from a storage medium through the reader 904 or from the network 4 through the communication unit 908, and then loaded onto the memory 902 to be executed by the CPU 901. Or, the program may be directly loaded onto the memory 902 without through the external storage 903, and then executed by the CPU 901. In these cases, the memory 902, the external storage 903, and/or a storage medium mounted on the reader 904 are/is used as the storage unit 14. Further, the communication unit 908 is used as the network IF unit 11. Further, the input unit 906 and the output unit 907 are used as the GUI unit 12.

Next, will be described operation of the load monitoring apparatus 1 of the above-described configuration.

Figure 12:
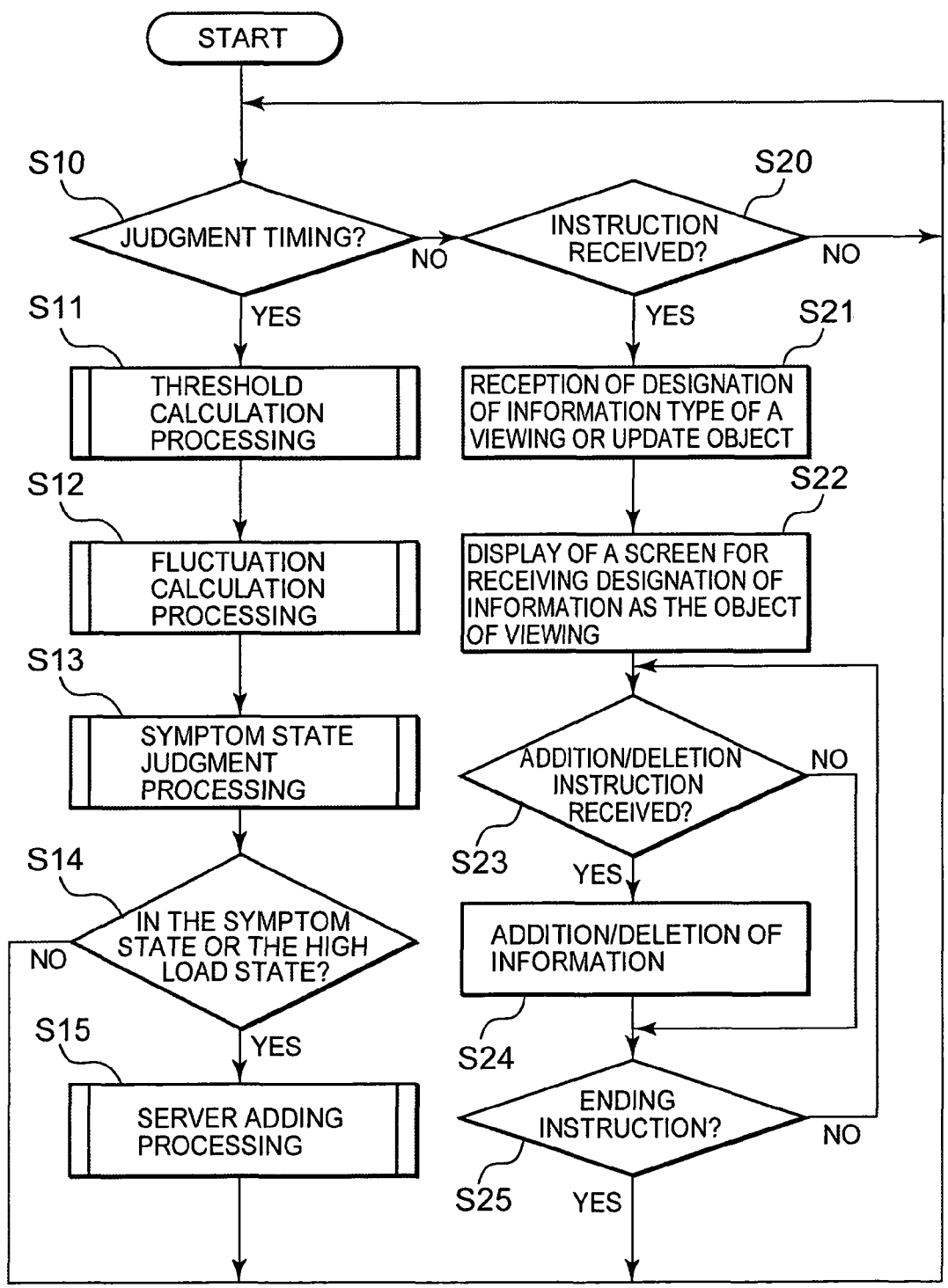
FIG. 12 is a flowchart for explaining an operation flow of the load monitoring apparatus 1.

FIG. 12 is a flowchart for explaining an operation flow of the load monitoring apparatus 1. Although not shown in this flowchart, the measured value collection unit 131 always performs processing of receiving measured value information from a server 3 through the network IF unit 11 and processing of adding a record 1410 of the received measured value information to the measured value storage unit 141, as described above.

Now, in FIG. 12, when the processing unit 13 detects a load state judgment timing such as an elapse of a given time or an arrival of a certain time using a built-in timer (not shown), or receives a load state judgment instruction from a user through the GUI unit 12 (YES in S10), the processing unit 13 selects a server 3 whose load state should be judged, according to predetermined rules. For example, from the configuration information storage unit 143, the processing unit 13 selects a record 1430 next to the record 1430 of the server 3 selected last (the top record in the case where the record of the last selected server 3 is the final record 1430). Then, the processing unit 13 selects a server 3 specified by the identification information registered in the field 1431 of the selected record 1430, as the server 3 whose load state should be judged. The processing unit 13 notifies the identification information of the selected server 3 to the threshold calculation unit 135. In the case where designation of a server 3 whose load state should be judged is received from the user through the GUI unit 12, the identification information of that serve 3 is notified to the threshold calculation unit 135.

Receiving the identification information of the server 3, the threshold calculation unit 135 performs processing of calculation of the static parameter information (a threshold) used for calculation of a fluctuation and/or judgment of the symptom state for this server 3 (S11).

Figure 13:
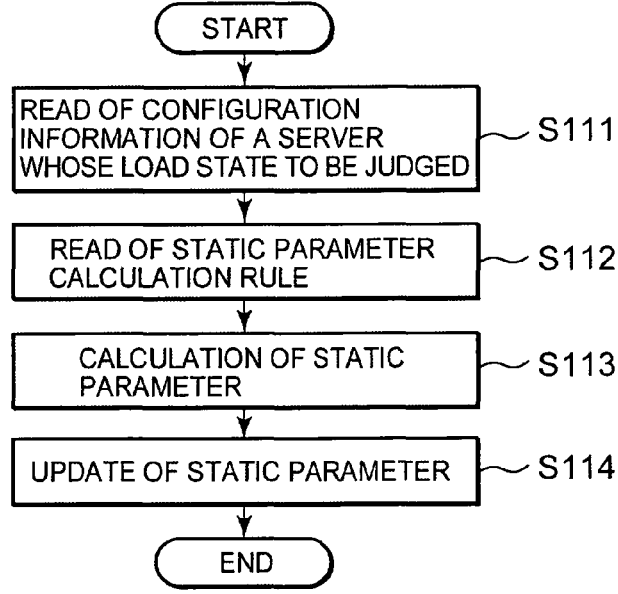
FIG. 13 is a chart for explaining an operation flow of a threshold calculation process S11.

FIG. 13 is a diagram for explaining an operation flow of the threshold calculation processing S11.

First, the threshold calculation unit 135 searches the configuration information storage unit 143 for a record 1430 with the field 1431 registering the identification information of the server 3 whose load state should be judged, and the reads the configuration information of the server 3 in question from the field 1432 of the retrieved record (S111). Further, the threshold calculation unit 135 reads the static parameter calculation rule information 1425 from the rule information storage unit 142 (S112).

Next, the threshold calculation unit 135 calculates the fluctuation calculation rule static parameter information 1422 and/or the symptom state judgment rule static parameter information 1424 according to the procedure described in the static parameter calculation rule information 1425, while using, as the arguments of the procedure, the configuration information (the CPU clock frequency, the number of CPUs, and the like) of the server 3 whose load state should be judged (S113). Then, the threshold calculation unit 135 replaces the fluctuation calculation rule static parameter information 1422 and/or the symptom state judgment rule static parameter information 1424 registered in the rule information storage unit 142, with the new-calculated fluctuation calculation rule static parameter information 1422 and/or the symptom state judgment rule static parameter information 1424 (S114).

When the threshold calculation unit 135 updates the static parameter information stored in the rule information storage unit 142, the processing unit 13 notifies the identification information of the server 3 whose load state should be judged to the fluctuation calculation unit 132.

Receiving the identification information of the server 3, the fluctuation calculation unit 132 performs processing of calculating a fluctuation of measured values that have been measured in the server 3 in a given time (S12).

Figure 14:
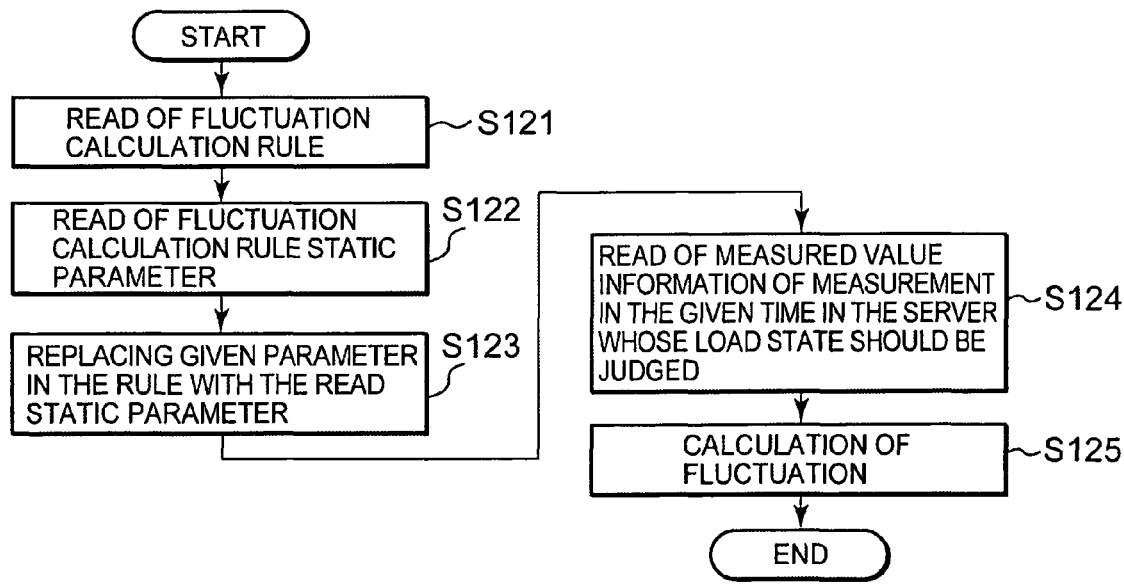
FIG. 14 is a chart for explaining an operation flow of a fluctuation calculation process S12.

FIG. 14 is a diagram for explaining an operation flow of the fluctuation calculation processing S12.

First, the fluctuation calculation unit 132 reads the fluctuation calculation rule information 1421 from the rule information storage unit 142 (S121). Further, the fluctuation calculation unit 132 reads the fluctuation calculation rule static parameter information 1422 from the rule information storage unit 142 (S122). Next, the fluctuation calculation unit 132 replaces the given parameter in the fluctuation calculation rule information 1421 with the numeric information indicated by the fluctuation calculation rule static parameter information 1422 (S123). Further, from the measured value storage unit 141, the fluctuation calculation unit 132 reads all records 1410 having the field 1411 registering a queue length as a measurement item, the field 1412 registering the identification information of the server 3 whose load state should be judged, and the field 1413 registering a measurement time in a given period (for example, extending from one minute ago to the present) (S124).

Next, following the procedure indicated in the fluctuation calculation rule information 1421 with the given parameter being replaced with the numeric information indicated by the fluctuation calculation rule static parameter information 1422, the fluctuation calculation unit 132 calculates a fluctuation of a plurality of measured values read from the measured value storage unit 141 (S125).

After the fluctuation calculation unit 132 calculates the fluctuation, the processing unit 13 notifies the symptom state judgment unit 133 of the fluctuation together with the identification information of the server 3 whose load state should be judged.

Receiving the fluctuation and the identification information of the server 3, the symptom state judgment unit 133 performs processing of judging whether the server 3 is in the symptom state or the high load state (S13).

Figure 15:
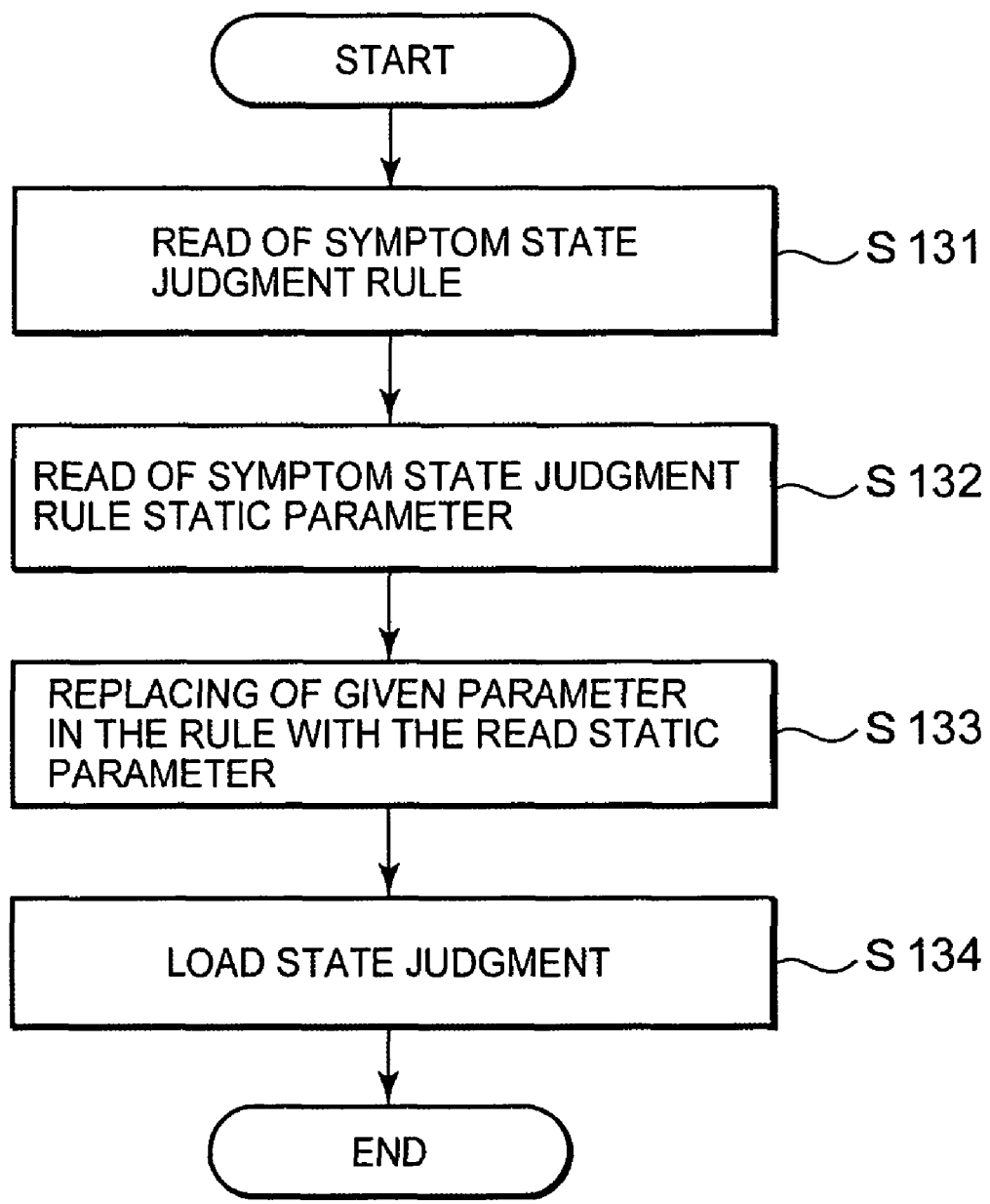
FIG. 15 is a chart for explaining an operation flow of a symptom state determination process S13.

FIG. 15 is a diagram for explaining an operation flow of the symptom state judgment processing S13.

First, the symptom state judgment unit 133 reads the symptom state judgment rule information 1423 from the rule information storage unit 142 (S131). Further, the symptom state judgment unit 133 reads the symptom state judgment rule static parameter information 1424 from the rule information storage unit 142 (S132). Next, a given parameter of the symptom state judgment rule information 1423 is replaced with numeric information indicated by the symptom state judgment rule static parameter information 1424 (S133).

Next, following the procedure described in the symptom state judgment rule information 1423 with given parameter being replaced with the numeric information indicated by the symptom state judgment rule static parameter information 1424, the symptom state judgment unit 133 judges whether the server 3 as the object the load judgment is in the symptom state or the high load state. Then, the symptom state judgment unit 133 displays the judgment result on the GUI unit 12 (S134).

After the symptom state judgment unit 133 judges whether the server 3 as the object of the load judgment is in the symptom state or the high load state, the processing unit 13 returns the processing to S10 when the judgment result shows that the server 3 is in neither the symptom state nor the high load state (NO in S14). On the other hand, when the judgment result shows that the server 3 is in the symptom state or the high load state (YES in S14), the processing unit 13 notifies the server adding unit 134 of the identification information of the server 3 as the object of the load judgment.

Receiving the identification information of the server 3, the server adding unit 134 performs processing of adding a new server 3 to the load distribution system to which the server 3 in question belongs (S15). Thereafter, the processing returns to S10.

Figure 16:
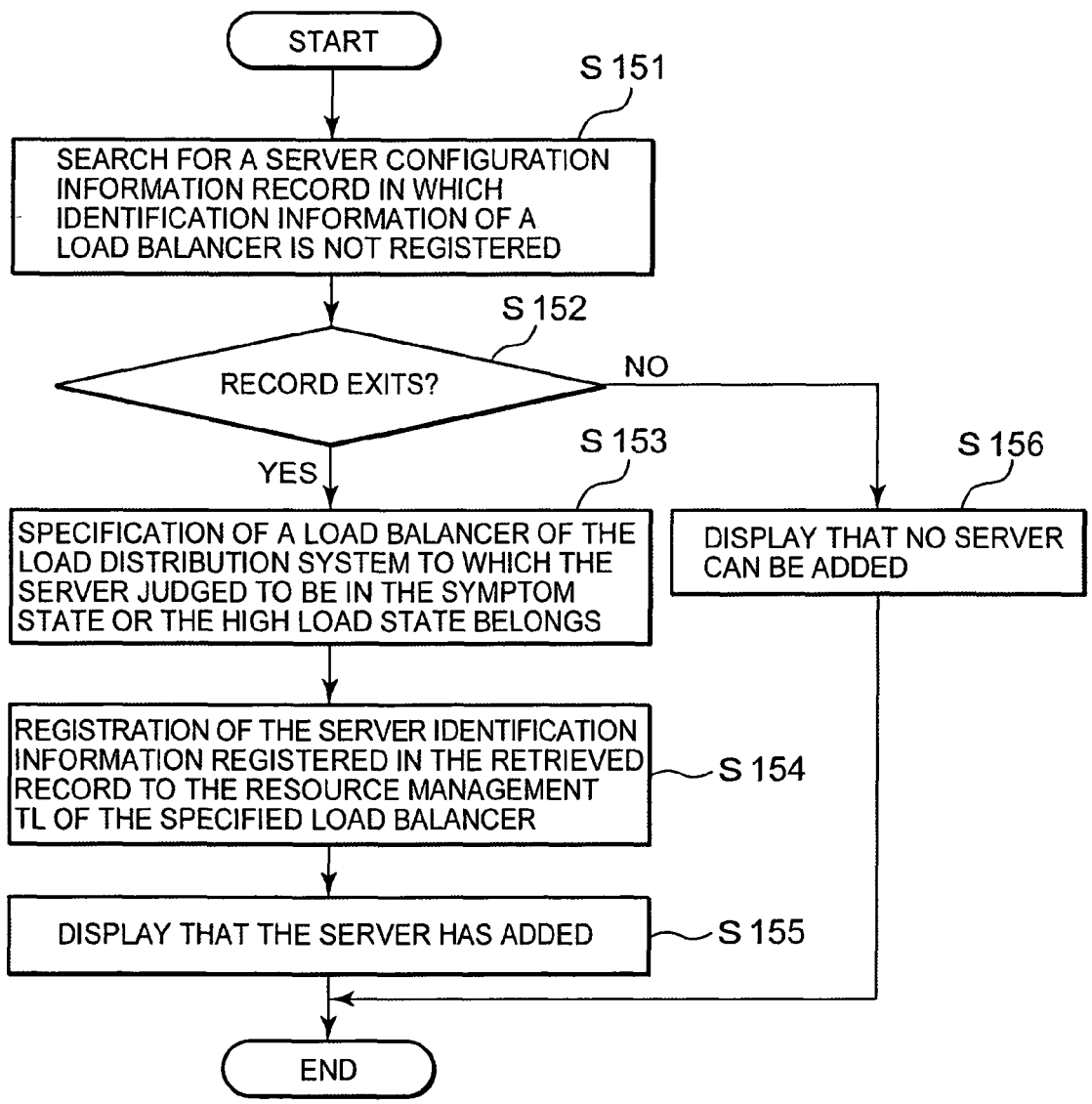
FIG. 16 is a chart for explaining an operation flow of a server addition process S15.

FIG. 16 is a diagram for explaining an operation flow of the server adding processing S15.

First, the server adding unit 134 searches the configuration information storage 143 for a record 1430 (an adding object server record) whose field 1433 does not register identification information of a load balancer 2 (S151). In the case where an addition object server record can not be retrieved (NO in S152), the server adding unit 134 displays a message to that effect together with the identification information of the server 3, which has received from the processing unit 13, on the GUI unit 12 (S156).

On the other hand, in the case where an addition object server record can be retrieved (YES in S152), the server adding unit 134 reads, from the configuration information storage unit 143, a record 1430 (a symptom state/high load state server record) whose field 1431 registers the identification information (received from the processing unit 13) of the server 3, to specify the identification information of the load balancer 2 registered in the field 1433 of the symptom state/high load state server record (S153). Then, through the network IF unit 11, the server adding unit 134 accesses the load balancer 2 having the identification information specified in S153, and registers the server identification information in the field 1431 of the adding object server record into the resource management TL 21 of the load balancer 2 (S154). Further, the server adding unit 134 displays a message to the effect that a new server 3 has been added, together with the identification information of the balancer 2 registered in the field 1433 of the symptom state/high load state server record, the identification information of the server 3 registered in the field 1431 of the addition object server record (i.e., the identification information of the added server 3), and the identification information of the server 3 registered in the field 1431 of the symptom state/high load state server record (i.e., the identification record of the server that has been judged to be in the symptom state or the high load state) (S155). Thereafter, the processing returns to S10.

Returning to FIG. 12, description will be continued. Receiving an instruction of, for example, viewing, addition or deletion of information stored in the storage unit 14 from a user through the GUI unit 12 (YES in S20), the processing unit 13 notifies the operation receiving unit 136 to that effect. Receiving the notification, the operation receiving unit 136 displays an input screen for receiving an information type of the object of viewing, addition or deletion (for example, identification information of a storage unit 141-143 that stores the information as the object of viewing, addition or deletion), on the GUI unit 12, to receive designation of the information type of the object of viewing, addition or deletion from the user (S21).

Next, the operation receiving unit 136 displays an information designation receiving screen for specifying desired information among pieces of information belonging to the information type received in S21, on the GUI unit 12 (S22). For example, in the case where the designated information type is the measured value storage unit 141, the operation receiving unit 136 displays the information designation receiving screen for receiving designation of the identification information of a server 3 for which measured values to be viewed (among measured value records 1410 stored in the measured value storage unit 141) have been measured. Or, in the case where the designated information type is the rule information storage unit 142, the operation receiving unit 136 displays the information designation receiving screen for receiving designation of information to be viewed among the fluctuation calculation rule information 1421, the fluctuation calculation rule static parameter information 1422, the symptom state judgment rule information 1423, the symptom state judgment rule static parameter information 1424, and the static parameter calculation rule information 1425. Or, in the case where the designated information type is the configuration information storage unit 143, the operation receiving unit 136 displays the information designation receiving screen for receiving designation of the identification information of a server 3 whose configuration information is to be viewed.

Next, in the case where the operation receiving unit 136 receives an instruction of adding information from the user through the information designation receiving screen displayed on the GUI unit 12 (YES in S23), the operation receiving unit 136 registers the information inputted by the user through the information designation receiving screen into the storage unit 142 or 143 that stores information belonging to the information type received in S21 (S24). Or, in the case where the operation receiving unit 136 receives an instruction of deleting information from the user through the information designation receiving screen (YES in S23), the operation receiving unit 136 deletes information designated by the user through the information designation receiving screen from the storage unit 142 or 143 that stores information belonging to the information type received in S21 (S24). Here, in the case where the storage unit storing information belonging to the information type received in S21 is the measured value storage unit 141, only viewing may be permitted while addition and deletion of information are inhibited.

Now, when the operation receiving unit 136 receives an instruction of ending viewing, addition or deletion of information stored in a storage unit 14 from the user through the GUI unit 12 (YES in S25), the operation receiving unit 136 ends displaying of the information designation receiving screen on the GUI unit 12, and thereafter, the processing returns to S10.

Hereinabove, one embodiment of the present invention has been described.

According to the above-described embodiment, a fluctuation of measured values that have been measured in a given time is used for judging whether a load state of a server 3 is the symptom state or the high load state. As described above, a queue length shows a burst. Accordingly, a difference between a fluctuation per a given time of measured values in the low load state and a fluctuation per the given time of measured values in the symptom state is larger than a difference between an average value per the given time of measured values in the low load state and an average value per the given time of measured values in the symptom state. Thus, using a fluctuation, it is possible to detect the symptom state of a server more accurately.

The present invention is not be limited to the above embodiment, and can be variously varied within the scope of the invention.

For example, processing of viewing, addition, deletion and the like of information stored in the storage units 141-143 is not limited to the above embodiment. For example, viewing, addition and deletion of the rule information 1421, 1423 or 1425 stored in the rule information storage unit 142 may be performed as follows.

(D-1) Viewing of Rule Information

The operation receiving unit 136 displays an administrator (user) operation screen for viewing rule information on the GUI unit 12. When an administrator selects viewing of any rule information on the screen, the operation content of the administrator is sent to the operation receiving unit 136 through the GUI unit 12. The operation receiving unit 136 reads the selected rule information from the rule information storage unit 142 and displays the rule information on the GUI unit 12.

(D-2) Addition of Rule Information

The operation receiving unit 136 displays an administrator operation screen for receiving input of a storage location of rule information to be added and for receiving execution of the addition from the administrator, on the GUI unit 12. When the administrator inputs the storage location of the rule information to be added and then selects the execution of the addition, the operation receiving unit 136 reads the rule information from the designated storage location and stores the rule information into the rule information storage unit 142.

(D-3) Deletion of Rule Information

The operation receiving unit 136 displays an administrator operation screen for receiving selection of rule information to be deleted and for receiving execution of the deletion from the administrator, on the GUI unit 12. When the administrator selects rule information to be deleted, on the screen, and selects the execution of the deletion, then the operation receiving unit 136 deletes the selected rule information from the rule information storage unit 142.

Further, viewing, change and generation of the static parameter information 1422 and 14234 stored in the rule information storage unit 142 may be performed as follows.

(E-1) Viewing of Static Parameter Information

The operation receiving unit 136 displays an administrator operation screen for viewing static parameter information, on the GUI unit 12. When the administrator selects viewing of any static parameter information, on the screen, then the operation content is sent to the operation receiving unit 136 through the GUI unit 12. The operation receiving unit 136 reads the selected static parameter information from the rule information storage unit 142, and displays the static parameter information on the GUI unit 12.

(E-2) Change of Static Parameter Information

The operation receiving unit 136 displays an administrator operation screen for receiving input of designation of static parameter information to be changed, input of a changed value, and execution of the change from the administrator, on the GUI unit 12. When the administrator designates the static parameter information to be changed, inputs a changed value, and selects the execution of the change, then the operation receiving unit 136 replaces the designated parameter information stored in the rule information storage unit 142 with the changed value inputted.

Further, in the case where a load balancer 2 does not have a function of changing the resource dynamically in the above embodiment, the server adding unit 134 may not perform processing of notifying a server 3 as the object of addition to the load balancer 2.

Further, in the above embodiment, the threshold calculation (generation of the static parameter information) may be performed separately from the flow shown in FIG. 12. In that case, prior to the flow of FIG. 12, the fluctuation calculation rule static parameter information 1422 and the symptom state judgment rule static parameter information 1423 are calculated for each server 3 and stored in the rule information storage unit 142. Then, in the flow of FIG. 12, the fluctuation calculation rule static parameter information 1422 and the symptom state judgment rule static parameter information 1424 of the server 3 whose load state should be judged are read out to be used in the fluctuation calculation processing S12 and the symptom state judgment processing S13. Here, the static parameter information may be generated as follows.

Namely, the operation receiving unit 136 displays an administrator operation screen for receiving designation of static parameter information and for receiving execution of the generation from the administrator, on the GUI unit 12. When the administrator designates static parameter information to be generated and selects the execution of the generation, on the screen, then the operation receiving unit 136 notifies the threshold calculation unit 135 of a parameter generation request with the designation of the static parameter information as the object of generation. Receiving the request, the threshold calculation unit 135 reads the static parameter calculation rule information from the rule information storage unit 142 for generating the designated static parameter, generates the static parameter information of each server 3 according to the procedure indicated in the rule information, and stores the generated static parameter information into the rule information storage unit 135.

Further, in the above embodiment, when it is judged that a server 3 is in the symptom state or the high load state, then a server 3 that does not belong to any load distribution system (i.e., a server 3 whose identification information is registered in the adding object server record) is selected as a server 3 to be added to the load distribution system to which the server 3 in the symptom state or the high load state belongs (i.e., a server 3 to be registered in the resource management TL 21 of the load balancer 2 of the load distribution system in question). However, the present invention is not limited to this. In the case where a server 3 belonging to no load distribution system does not exist, a server in the low load state may be selected. Namely, a record 1430 of the configuration information of each server 3 is provided with a load state field for registering a load state of the server 3. Then, in the symptom state judgment processing 13, a load state judgment result (indicating whether a server in question is in the symptom state or the high load state) is registered in the load state field of a record 1430 of the configuration information of the server 3 whose load state has been judged. Then, when an adding object server record is not detected in the server adding processing S15, a configuration information record 1430 whose load state judgment result registered in its load state field shows that the server 3 concerned is not in the symptom state and the high load state, i.e., the server 3 is in the low load state, is searched for. When such a record 1430 is retrieved, the record 1430 is taken as the adding object server record, and the identification information registered in the field 1431 of the record 1430 is registered in the resource management TL 21 of the load balancer 2 of the load distribution system to which the server 3 judged to be in the symptom state or the high load state belongs.

Further, the above embodiment has been described taking the example where the performance information showing a burst is a queue length. However, the present invention is not limited to this. The present invention can be applied to another kind of performance information than the queue length as far as the performance information shows a burst. As performance information showing a burst other than the queue length, may be mentioned a response time. In the case of using a response time, a response time measurement unit corresponding to the queue length measurement unit 31 in the above embodiment may not be mounted on each server 3. Namely, one response time measurement unit 31 may measure a response time of each of a plurality of servers 3, and send measured value information to the load monitoring apparatus 1. Further, kinds of performance information each showing a burst may be used to make integrated judgment using respective load state judgment results of the kinds of performance information (for example, a server 3 may be judged to be in the symptom state or the high load state when a load state judgment result of some kind of performance information shows the symptom state or the high load state).

Further, in the above embodiment, addition of the resource is performed in units of servers 3. However, the present invention is not limited to this. For example, assignment of the resource may be performed in units of operating times of a CPU, available amounts of a memory, or the like. For example, in the case where a plurality of applications run on one information processing apparatus and an OS operating on the information processing apparatus manages the resource (CPU operating times, available capacity of the memory, and the like) allocated to each application, it is possible that the queue length measurement unit mounted on the information processing apparatus measures a queue length for each application and notifies the measurement result to the load monitoring apparatus 1, and the load monitoring apparatus 1 judges a load state for each application and notifies an administrator of an application that is judged to be in the high load state. Further, an application judged to be in the symptom state or the high load state is notified to the OS of the information processing apparatus, and the OS assigns a free resource to the application judged to be in the symptom state or the high load state. Or, the OS reallocates the resources to running applications.

What is claimed is:

1. A load monitoring apparatus for monitoring a load state of an information processing apparatus, comprising:
   a measured value storage unit which stores measured value information indicating at least one of a queue length as a number of requests held in a queue of said information processing apparatus or a response time for a request processed by said information processing apparatus along with a measurement time;
   a measured value collection unit which receives the measured value information and the measurement time from said information processing apparatus in real time, and stores the measured value information and the measurement time in said measured value storage unit;
   a fluctuation judgment unit, in a predetermined timing, which reads a plurality of measured values from said measured value storage unit for a predetermined period, calculates a sum of a number of measured values which is larger than a first threshold and a number of measured values which is less than a second threshold smaller than said first threshold among the plurality of measured values for the predetermined period, and judges that the plurality of measured values for the predetermined period are in a large fluctuation state when the calculated sum is larger than a predetermined load state judgment threshold; and
   a load state notification unit which notifies of a load state of said information processing apparatus being in a symptom state just before a high load state when the plurality of measured values for the predetermined period are judged to be in said large fluctuation state by said fluctuation judgment unit;
   a configuration information storage unit which stores configuration information of said information processing apparatus; and
   a threshold calculation unit which calculates said predetermined load state judgment threshold corresponding to performance of said information processing apparatus based on the configuration information stored in said configuration information storage unit.

2. The load monitoring apparatus according to claim 1, wherein said fluctuation judgment unit is further configured to:
   read the plurality of measured values measured in the predetermined period and the measurement times paired with the respective measured values from the measured value storage unit;
   transform the plurality of measured values and the measurement times paired with the respective measured values into a frequency spectrum;
   detect all frequency components having an amplitude larger than or equal to a fluctuation judgment threshold;
   obtain a group of detected frequency components as fluctuations within the predetermined period; and
   judge the load state of said information processing apparatus being in the symptom state by determining whether there is a frequency component whose frequency is larger than or equal to said predetermined load state judgment threshold, among all frequency components included in said fluctuations obtained.

3. A load monitoring apparatus for monitoring a load state of an information processing apparatus, comprising:
a measured value storage unit which stores measured value information indicating at least one of a queue length as a number of requests held in a queue of said information processing apparatus or a response time for a request processed by said information processing apparatus, along with a measurement time;
a measured value collection unit which receives the measured value information and the measurement time from said information processing apparatus in real time, and stores the measured value information and the measurement time in said measured value storage unit;
a fluctuation judgment unit, in a predetermined timing, which reads a plurality of measured values from said measured value storage unit for a predetermined period, calculates a variance or a standard deviation of the plurality of measured values for the predetermined period, and judges that the plurality of measured values for the predetermined period are in a large fluctuation state when the calculated variance or standard deviation is larger than a predetermined load state judgment threshold; and
a load state notification unit which notifies of a load state of said information processing apparatus being in a symptom state just before a high load state when the plurality of measured values for the predetermined period are judged to be in said large fluctuation state by said fluctuation judgment unit;
a configuration information storage unit which stores configuration information of said information processing apparatus; and
a threshold calculation unit which calculates said predetermined load state judgment threshold corresponding to performance of said information processing apparatus based on the configuration information stored in said configuration information storage unit.

4. The load monitoring apparatus according to claim 3, wherein said fluctuation judgment unit is further configured to:
read the plurality of measured values measured in the predetermined period and the measurement times paired with the respective measured values from the measured value storage unit;
transform the plurality of measured values and the measurement times paired with the respective measured values into a frequency spectrum;
detect all frequency components having an amplitude larger than or equal to a fluctuation judgment threshold;
obtain a group of detected frequency components as fluctuations within the predetermined period; and
judge the load state of said information processing apparatus being in the symptom state by determining whether there is a frequency component whose frequency is larger than or equal to said predetermined load state judgment threshold, among all frequency components included in said fluctuations obtained.

5. A load monitoring apparatus for monitoring a load state of an information processing apparatus, comprising:
a measured value storage unit which stores measured value information indicating at least one of a queue length as a number of requests held in a queue of said information processing apparatus or a response time for a request processed by said information processing apparatus along with a measurement time;
a measured value collection unit which receives the measured value information and the measurement time from said information processing apparatus in real time, and stores the measured value information and the measurement time in said measured value storage unit;
a fluctuation judgment unit, in a predetermined timing, which reads a plurality of measured values from said measured value storage unit for a predetermined period, reads the plurality of measured values for the predetermined period and measurement times paired with the respective measured values from said measured value storage unit, transforms the plurality of measured values and measurement times paired with the respective measured values into a frequency spectrum, and judges that the plurality of measured values within the predetermined period are in a large fluctuation state when there is a frequency component larger than a predetermined load state judgment threshold among the calculated frequency components; and
a load state notification unit which notifies of a load state of said information processing apparatus being in a symptom state just before a high load state when the plurality of measured values for the predetermined period are judged to be in said large fluctuation state by said fluctuation judgment unit.

6. The load monitoring apparatus according to claim 5, further comprising:
a configuration information storage unit which stores configuration information of said information processing apparatus; and
a threshold calculation unit which calculates said predetermined load state judgment threshold corresponding to performance of the information processing apparatus, based on the configuration information stored in said configuration information storage unit.

7. A load monitoring method for monitoring a load state of an information processing apparatus, comprising:
a measured value collection step which receives measured value information indicating at least one of a queue length as a number of requests held in a queue of said information processing apparatus or a response time for a request processed by said information processing apparatus, along with a measurement time in real time, and stores said measured value information and said measured time in a measures value storage unit;
a fluctuation judgment step, in a predetermined timing, which reads a plurality of measured values for a predetermined period from the measured value storage unit, calculates a sum of a number of measured values which is larger than a first threshold and a number of measured values which is less than a second threshold smaller than said first threshold among the plurality of measured values for the predetermined period, and judges that the plurality of measured values for the predetermined period are in a large fluctuation state when the calculated sum is larger than a predetermined load state judgment threshold;
a load state notification step which notifies of a load state of said information processing apparatus is in a symptom state just before a high load state when the plurality of measured values for the predetermined period are judged to be in said large fluctuation state;
storing configuration information of said information processing apparatus in a configuration information storage unit; and calculating said predetermined load state judgment threshold corresponding to performance of said information processing apparatus, based on the configuration information stored in said configuration information storage unit.

8. A computer storage medium having embodied thereon a program for execution by a computer system to function as a load monitoring apparatus for monitoring a load state of an information processing apparatus in a network, said program comprising:

a measured value storing module, which stores measured value information indicating at least one of a queue length as a number of requests held in a queue of said information processing apparatus or a response time for a request processed by said information processing apparatus, along with a measurement time;

a measured value collection module which receives the measured value information and the measurement time in real time, and stores the measured value information and the measurement time in said measured value storing module;

a fluctuation judgment module, in a predetermined timing, which reads a plurality of measured values for a predetermined period from said measured value storing module, calculates a sum of a number of measured values which is larger than a first threshold and a number of measured values which is less than a second threshold smaller than said first threshold among the plurality of measured values for the predetermined period, and judges that the plurality of measured values within the predetermined period are in a large fluctuation state when the calculated sum is larger than a predetermined load state judgment threshold; and a load state notification module which notifies of a load state of said information processing apparatus being a symptom state just before a high load state when the plurality of measured values for the predetermined period are judged to be in said large fluctuation state by said fluctuation judgment module;

a configuration information storage unit which stores configuration information of said information processing apparatus; and a threshold calculation unit which calculates said predetermined load state judgment threshold corresponding to performance of said information processing apparatus based on the configuration information stored in said configuration information storage unit.

* * * * *